United States Patent [19]

Burr

[11] Patent Number: 5,607,503

[45] Date of Patent: Mar. 4, 1997

[54] SILICA-BASED BINDER

[75] Inventor: Harley W. Burr, Corona Del Mar, Calif.

[73] Assignee: Refract-A-Gard Pty Limited, Sydney, Australia

[21] Appl. No.: 116,398

[22] Filed: Sep. 3, 1993

[51] Int. Cl.$^6$ .......................... C01B 33/32; C01B 21/06; C01C 1/00

[52] U.S. Cl. ................. 106/287.11; 106/600; 106/629; 106/630; 106/634; 423/338

[58] Field of Search ................ 106/600, 14.13, 106/14.15, 14.17, 287.11, 634, 629, 630; 423/338

[56] References Cited

U.S. PATENT DOCUMENTS

| | | | |
|---|---|---|---|
| 2,885,419 | 5/1959 | Beinfest et al. | 106/287.11 |
| 3,079,656 | 3/1963 | Emblem et al. | 106/287.11 |
| 3,110,601 | 11/1963 | Emblem et al. | 106/287.11 |
| 3,301,853 | 1/1967 | Weldes | 106/287.11 |
| 3,329,520 | 7/1967 | Emblem et al. | 106/287.11 |
| 3,551,173 | 12/1970 | Von Mildenstein | 106/623 |
| 3,849,149 | 11/1974 | Swift | 106/465 |
| 3,893,864 | 7/1975 | Beers | 106/287.11 |
| 3,914,518 | 10/1975 | Haskell | 428/451 |
| 3,930,876 | 1/1976 | Nakajima et al. | 106/287.11 |
| 3,951,853 | 4/1976 | Suwala | 252/321 |
| 4,011,088 | 3/1977 | Makishima et al. | 106/287.11 |
| 4,156,717 | 5/1979 | Wason | 423/339 |
| 4,224,169 | 9/1980 | Retana | 252/607 |
| 4,230,496 | 10/1980 | Falcone, Jr. et al. | 106/14.21 |
| 4,242,217 | 12/1980 | Westermann et al. | 252/135 |
| 4,247,657 | 1/1981 | Blount | 521/175 |
| 4,283,311 | 8/1981 | Blount | 524/733 |
| 4,291,154 | 9/1981 | Blount | 528/335 |
| 4,312,845 | 1/1982 | Wason | 423/339 |
| 4,341,559 | 7/1982 | Friedemann et al. | 106/38.35 |
| 4,479,824 | 10/1984 | Schutt | 106/14.21 |
| 4,537,705 | 8/1985 | Mahoney et al. | 252/529 |
| 4,654,252 | 3/1987 | Doyen | 428/213 |
| 4,664,836 | 5/1987 | Taylor, Jr. | 252/91 |
| 4,719,548 | 3/1988 | Sullins | 264/30 |
| 4,792,357 | 12/1988 | Bier | 106/83 |
| 4,828,965 | 5/1989 | West et al. | 430/309 |
| 4,863,518 | 9/1989 | Blount | 106/634 |
| 4,983,218 | 1/1991 | Mascioli | 106/600 |
| 5,096,610 | 3/1992 | Bingham | 252/162 |

FOREIGN PATENT DOCUMENTS

| | | |
|---|---|---|
| 8040/66 | 11/1968 | Australia . |
| 10208/76 | 7/1977 | Australia . |
| 17157/83 | 9/1984 | Australia . |
| 13186/88 | 9/1988 | Australia . |
| 76364/91 | 11/1991 | Australia . |
| 77026/91 | 11/1991 | Australia . |
| 2012739 | 4/1991 | Canada . |
| 1285462 | 7/1991 | Canada . |
| 15236 | 8/1980 | European Pat. Off. . |
| 79845 | 5/1983 | European Pat. Off. . |
| 108827 | 5/1984 | European Pat. Off. . |
| 172427 | 2/1986 | European Pat. Off. . |
| 292967 | 11/1988 | European Pat. Off. . |
| 64763 | 11/1968 | Germany . |
| 2941596 | 4/1981 | Germany . |
| 274132 | 12/1989 | Germany . |
| 22693 | 6/1982 | Hungary . |
| 45-017068 | 3/1970 | Japan . |
| 52-062505 | 5/1972 | Japan . |
| 52-089136 | 7/1977 | Japan . |
| 53-023195 | 3/1978 | Japan . |
| 82031472 | 11/1979 | Japan . |
| 55-054358 | 4/1980 | Japan . |
| 55-054356 | 4/1980 | Japan . |
| 55-133497 | 10/1980 | Japan . |
| 56-016096 | 2/1981 | Japan . |
| 57-036156 | 2/1982 | Japan . |
| 57-063362 | 4/1982 | Japan . |
| 57-125249 | 8/1982 | Japan . |
| 58-040368 | 3/1983 | Japan . |
| 59-197472 | 11/1984 | Japan . |
| 61-031478 | 2/1986 | Japan . |
| 61-225044 | 10/1986 | Japan . |
| 62-202005 | 9/1987 | Japan . |
| 62-227986 | 10/1987 | Japan . |
| 63-043965 | 2/1988 | Japan . |
| 1224041 | 9/1989 | Japan . |
| 1287561 | 11/1989 | Japan . |
| 3031367 | 2/1991 | Japan . |
| 04185669 | 7/1992 | Japan . |
| 05032769 | 2/1993 | Japan . |
| 8802627 | 11/1988 | South Africa . |
| 283484 | 12/1972 | U.S.S.R. . |
| 410072 | 9/1974 | U.S.S.R. . |
| 608816 | 5/1978 | U.S.S.R. . |
| 697448 | 11/1979 | U.S.S.R. . |
| 1115852 | 9/1984 | U.S.S.R. . |
| 1286604 | 1/1987 | U.S.S.R. . |
| 1715451 | 2/1992 | U.S.S.R. . |
| 1068705 | 5/1967 | United Kingdom . |
| 1151531 | 5/1969 | United Kingdom . |
| 1309092 | 10/1973 | United Kingdom . |
| 1390526 | 4/1975 | United Kingdom . |
| 2095297 | 9/1982 | United Kingdom . |

OTHER PUBLICATIONS

Derwent Abstract Accession No. 92–371146/65, Class G02 L02, KR A, 9106387 (Korea Chem Co) (21 Aug. 1991).

Derwent Abstract Accession No. 72702A/41, Class E34 G03, BE, A, 865563 (Henkel KG Auf Aktien) 2 Oct. 1978.

Derwent Abstract Accession No. 20167W/12, Class G02 L02, JP, A, 49–134728 (Kansai Paint Co Ltd) (Matu) 25 Dec. 1974.

*Primary Examiner*—Anthony Green
*Attorney, Agent, or Firm*—Ladas & Parry

[57] ABSTRACT

An insoluble silica based film is formed by placing an ammonium compound and an alcohol as a plasticizing agent in an aqueous solution and blending the aqueous solution with a sodium silicate. The mixture is allowed to condense which produces the insoluble silica-based film. The film is used as a binder, and has particular application as a vehicle in a paint. The invention also describes a method for preparing an insoluble silica-based binder.

24 Claims, No Drawings

SILICA-BASED BINDER

FIELD AND BACKGROUND OF THE INVENTION

This invention relates to compositions and methods used in the formulation of substances such as paints, coatings and adhesives. More particularly, but not exclusively, the invention relates to paints and the use in such paints of vehicles which reduce or minimize volatility, combustion, and instability of such paints.

Paint is generally comprised of an inert component or pigments such as white rock powders, titanium oxide and the like, and a binder, known as a vehicle, which holds the inert materials or pigments together to permit application thereof to, for example, a wall. The vehicle component of paint typically comprises a synthetic resin which acts as a carrier for the pigment or inert components. In addition, the vehicle may include chemicals which facilitate or improve the handling of the paint, thus, for example, making it easier to brush, having improved viscosity, and anti-corrosive activity. The vehicle may further include anti-mildew forming chemicals.

One problem with many existing paints is that the synthetic resin component of the vehicle may be flammable, and give off volatile organic chemicals. Combustion of the paint may also produce toxic elements which are undesirable.

An inorganic binder in a paint, instead of a synthetic resin, would diminish or obviate many of these problems. Further, inorganic binders would not degrade as readily by exposure to ultraviolet light, as would be the case with such a synthetic resin. Thus, a totally inorganic binder would eliminate or substantially reduce UV light exposure problems, as well as combustibility of the paint. However, there are certain drawbacks associated with inorganic binders which have not encouraged their use in the paint industry. Such drawbacks include an unacceptably high moisture sensitivity, and an increased brittleness which effectively excludes such inorganic binders from use in paints.

It is therefore an object of the invention to provide an improved binder for use in paints, coatings, adhesives and other applications. The invention attempts to avoid or reduce the problems highlighted above, and generally associated with the synthetic resin binders on the one hand, and the substantial use of inorganic binders on the other.

The present invention is also directed to the development of an adhesive system, particularly for use in paints, which is more environmentally stable than the use of synthetic resin materials.

SUMMARY OF THE INVENTION

According to one aspect of the invention, there is provided an silica-based binder which is the reaction product of an ammonium, amine or amide compound blended with a silicate. Preferably, a plasticizer is also used as a reactant, and the plasticizer may be alcohol.

Preferably, the ammonium compound is selected from the group consisting of ammonium hydroxide, hexamethylene tetramine, triethanol amine (TEA). The silicate, which may be a liquid silicate, is preferably selected from the group consisting of sodium silicate, potassium silicate, methyl silicate, colloidal silicates and ethyl silicate. The alcohol is preferably selected from the group consisting of ethyl alcohol, isopropyl alcohol, ethylene glycol, propylene glycol, glycerol, sorbitol and mannitol.

Preferably, the ammonium, amine or amide compound and alcohol are in an aqueous solution prior to the blending thereof with the silicate. Further, an alkali metal hydroxide may be added to adjust pH. The reaction product may also be exposed to direct sunlight, which has the effect of accelerating the curing.

In one embodiment, the binder is the reaction product of 15% to 20% of polyhydric alcohol and 5% to 10% of the ammonium compound by weight in an aqueous solution, blended with 70% to 80% of sodium silicate.

According to another aspect of the invention there is provided a method of forming an insoluble silica-based binder comprising providing an ammonium, amine or amide compound in an aqueous solution; blending the ammonium compound in aqueous solution with a liquid silicate to form a mixture; and condensing the mixture to form an inorganic silica-based binder. The method may further comprise adding a plasticizing agent to the ammonium, amine or amide compound in aqueous solution, the plasticizer preferably being an alcohol. Further, an alkali metal hydroxide may be used to control pH, and the condensation mixture may be exposed to sunlight to accelerate curing.

The preferred ammonium compounds, silicates and alcohol are as set forth above.

According to yet a further aspect of the invention, there is provided a gelation compound which is the reaction product between a reactive compound and a liquid silicate. Preferably, the reactive compound is selected from the group consisting of an ammonium, amine or amide compound, sodium hexametaphosphate, glycols and primary alcohols.

DETAILED DESCRIPTION OF THE PREFERRED EMBODIMENTS

Generally stated, the invention incorporates as a vehicle the reaction product of an ammonium, amine or amide compound, and a liquid silicate. Alcohol may be used as a plasticizer where extensibility is desired. Typically, alcohol is mixed with an ammonium compound in an aqueous solution, and thereafter blended with a liquid silicate, preferably a sodium silicate, to produce a condensation reaction. The reaction product comprises an insoluble film-forming polymeric appearing substance, which constitutes the binder for use in the vehicle of the paint.

Generally, the invention also provides for creation of a gelation compound which is the reaction product between a reactive compound and a liquid silicate. The gelation reaction is controlled either by limitation of the quantity of the reactive compound in relation to the silicate, or by buffering the solution of the reactive compound before it is combined with the liquid silicate. In this case, the gelation product is the insoluble film.

The reactive compound may be selected from the group consisting of an ammonium compound, hexametaphosphates including sodium hexametaphosphate, the glycols including propylene and ethylene glycol, and any of the primary alcohols.

The chemical properties of the compounds of silicon provide a logical basis for further experimentation in providing an improved paint vehicle. Liquid silicates, which are readily available commercially and provide appropriate chemical reactivity, are the preferred materials. Other forms of silica, such as fused, precipitated and gel forms thereof, have limited use by virtue of solubility, and, while they may in fact be used and are within the scope of the invention, the liquid silicates are preferred.

The various forms of sodium silicate, and to some extent potassium silicate and ethyl silicate, are already used as glues and sealants, although their application has been directed mainly towards paper products. While ethyl silicate has been fairly extensively researched for the purpose of developing an anti-corrosive and an artist paint vehicle, efforts in this area have been affected by complex catalytic control problems in the reaction.

In the production of precipitated silica, a wet process combining sodium silicate and sulfuric acid is used to manufacture the fine silica grain. Liquid sodium silicate will react with many chemicals, such as aqueous miscible ketones, primary alcohols, glycols and ammonium compounds, culminating in similar precipitation products. The control of the precipitation in these type of reactions, permits production of alternative chemical compounds.

Preferably, the reaction of this invention includes the combination of alcohol and the ammonium compound in an aqueous solution. The alcohol acts as a plasticizing agent which results in extensibility or flexibility of the insoluble film. The alcohol may be present as a discrete component of the reaction, or an ammonium, amine or amide compound may be selected which includes an alcohol component. Thus, if the ammonium, amine or amide compound selected is TEA (which comprises three parts alcohol and one part amine), an insoluble film results which has some, albeit limited, extensibility. If alcohol is present as a separate component, such as in the form of a glycerol, increased extensibility in the insoluble film will result.

Although the use of the alcohol as a plasticizing agent results in the extensibility properties of the insoluble film, the alcohol may be omitted, and the reaction product blend will nevertheless provide the insoluble film. However, the film would not have the features and benefits of polyhydric alcohol which would be present when alcohol is one of the reactants, and the resulting insoluble film would have minimal or no extensibility. Although insoluble films produced by the invention which lack extensibility are not preferred for use as a vehicle in paints, such insoluble forms of the invention do have other applications, such as in the use of adhesive.

Where an insoluble film is produced by the process of the invention which does not include the use of alcohol as a reactant, an ammonium, amine or amide compound selected may comprise hexamethylene tetramine and this results in an insoluble film lacking extensibility.

Liquid silicates are preferred in this invention. Possible silicates include sodium silicate, potassium silicate, and ethyl silicate. All may be used in the invention, although the most preferable of these showing the best experimental activity was 40° C. to 42° C. baume sodium silicate.

Any liquid silicate may be used, such as sodium silicate, potassium silicate, ethyl silicate and methyl silicate. It is possible that colloidal silicates may also work, and therefore form part of this invention.

Generally, silicates which are already glass in a suspension agent may be used. In other words, such silicates form glass when the water is evaporated off. The suspension agent is usually water for inorganic silicates, and alcohol for the organic silicates.

The ammonium, amine or amide compound, which is the reactive component, is preferably selected from the group ammonium hydroxide, hexamethylene tetramine, TDA and triethanol amine.

Where alcohol is used as a plasticizing agent as a separate reactant, such alcohols may be selected from ethyl alcohol, isopropyl alcohol, ethylene glycol, propylene glycol and glycerol.

With respect to the alcohol, complex alcohols are preferred, such as sorbitol and mannitol. It has been found that simple or primary alcohols such as methyl, isopropyl and butyl, are not as effective. In testing, some success was achieved using benzol alcohol.

The selections provided above are not intended to be definitive, but merely exemplify the type of reactants which may be used. However, the use of other compounds including formamide, dimethyl formamide, diammonium phosphate, ammonium sulfate, and urea may be used as reactants, while benzyl alcohol, carbitol cellosolve, mannitol and sorbitol may be used as alcohols. The alternative compounds set forth above may well have differing degrees of effectiveness. An increase in the effects of different chemicals would clearly be achieved by stoichiometrically proportioning the various components so that the reaction product, namely, an insoluble film, would be produced within an acceptable time frame.

In one embodiment for producing an insoluble film for use as a paint vehicle, an alcohol was mixed with an ammonium compound in an aqueous solution with no apparent chemical reaction. The alcohol and ammonium compound in an aqueous solution was in turn blended with sodium silicate, producing a condensation reaction which resulted in the film-forming insoluble polymeric appearing substance.

The preferred use of an aqueous solution as the starting base is to facilitate control of the reaction parameters. For example, the solution permits the making of the pH adjustments, dissolving the powders and diluting certain compounds. In this way, all the reactants may be made compatible to facilitate the reaction. In one example, three components in liquid form were proportioned so that no precipitation nor gelation occurs. The compounds are triethanol amine, glycerol and silicate. In such a case, no additional water is required for adequate blending. pH adjustment may be accomplished by using an alkalimetal hydroxide although an ammonium hydroxide could be used. Such hydroxides have a tendency to weaken the moisture sensitivity resistance of the film because of the induced solubility.

In obtaining the insoluble film which is the reaction product as described above, all experiments were conducted under normal atmospheric conditions. Temperature and pressure are therefore not considered critical, although adjustment of these parameters may increase the efficacy of the chemical reaction, or reduce the time taken for the products to form.

Furthermore, some of the test samples were exposed on glass plates to direct sunlight, which had the effect of accelerating the curing action. It was assumed that this acceleration was due to the volatile free water in the sample being expelled more rapidly due to evaporation.

Preferably, 15% to 20% of polyhydric alcohol, as the plasticizing agent, and 5% to 10% of the ammonium compound by weight, are mixed in the aqueous solution. This is blended with 70% to 80% of sodium silicate and the reactant condensed to produce the insoluble film polymeric substance. The proportions given above have, through experiment, provided the most consistent film-forming combination. Throughout, organic chemical compounds were restricted to minimum quantities to control environmental degradation and to conform with the object of creating comprehensive coating stability.

Where an alkali metal hydroxide is introduced into the reaction, it has been found that the quantities of both the alcohol and the ammonium compound can be increased relative to the sodium silicate.

As mentioned above, alcohol is optional, but its use as a reactant, either as a discrete component in the reaction or through the use of an ammonium compound including alcohol, lends extensibility or bendabiltiy to the product. Glycerol is appropriate for use, and is miscible in unlimited proportions with sodium silicate.

However, glycerol has the disadvantage in that its hygroscopicity has a limiting effect on the extent to which it may be used. Glycols are more reactive with sodium silicate, requiring some buffering for compatibility. This compatibility can be readily achieved with more complex water soluble polyhydric alcohols without further pH adjustment.

The alcohol used as the plasticizing component has been found to have little effect on the curing properties of the film. It has been found that glycols are suitable for film-formation if 25% by weight of the sodium silicate is not exceeded in quantity. The hygroscopic properties of glycerol, as mentioned above, may result in commercial product failure when such glycerols are used in an amount in excess of 50% by weight of the sodium silicate. Further, it results in a undesirable quantity of hydrocarbons in the film structure which will result in environmental problems, as noted above, which the present invention attempts to reduce.

The reactive component is the ammonium, amine or amide compound which has been found to trigger the reaction, and has never been used in circumstances similar to that of the present invention. Preferably, the ammonium compound is an amine or an amide. It has been found that ammonium itself may suffice, but that an ammonium compound is presently the preferred reactive agent.

Large percentages of the ammonium, amine or amide component, in excess of 15% by weight of the sodium silicate, usually produce a crystalline precipitate from the solution while mixing the compounds. As the ammonium, amine or amide compound is reduced in percentage, a soft gelation occurs. Additional reduction results in a clear stable solution which facilitates the film formation when dried on an applied surface. As the quantity of the reactive component (the ammonium compound) is decreased, it has been found that there is a time gradient of gel formation in the solution. This time factor is relevant to the curing cycle. It takes increasingly longer time periods for the film to mature where decreasing quantities of ammonium, amine or amide compound are used in the formula. The smallest amount of the ammonium compound as the reactive material used in the test was approximately 0.5 to 1% by weight of the sodium silicate. Although this produced a satisfactorily cured film, several days were necessary to accommodate the cure.

While the invention has been tested using the reactants as specified above, and the reaction product in the form of the insoluble film possesses the desired properties, it is not at this stage known what the exact structure of the complete chemical reaction is which is responsible for the insoluble film formation. Further, the invention is not limited to any proportion or specific components which are specifically noted above. Any of the combinations which, as reactants, operate to form the desired insoluble film fall within the scope of the invention. Further, the use of different components would necessitate variations in stoichiometric proportions and combinations, and the character of the ultimate product which is desired in the circumstances may also influence the nature and proportion of the components.

The process of the invention includes first preparing the ammonium, amine or amide compound (with or without the alcohol plasticizer, depending on whether extensibility is required in the insoluble film). These are mixed in aqueous solution. Thereafter, they are blended with sodium silicate, resulting in a condensation product which appears as a polymeric substance.

EXAMPLES

Example 1

A condensation reaction between hexamethylene tetramine, propylene glycol and sodium silicate yielded a polymeric type of viscous solution, segregated from the water, and dried to an insoluble film when applied to an inert surface.

Example 2

Example 1 is repeated using 40° C. to 42° C. baume sodium silicate.

Example 3

A condensation reaction between hexamethylene tetramine, propylene glycol and sodium silicate yielded a polymeric type of viscous solution, segregated from the water, and dried to an insoluble film when applied to an inert surface. pH adjustment was accomplished using an alkali metal hydroxide.

Example 4

Three compounds in liquid form, triethanol amine, glycerol and silicate were combined in proportional quantities so that no precipitation nor gelation occurs. The reaction was permitted to proceed under normal atmospheric conditions (temperature and pressure).

Example 5

In any of the Examples above, the test samples were exposed to direct sunlight and the curing action was accelerated.

Example 6

15% to 20% of polyhydric alcohol and 5% to 10% of an ammonium compound by weight were mixed together in an aqueous solution and thereafter blended with 70% to 80% sodium silicate.

Example 7

An ammonium compound, alcohol and sodium silicate were reacted, as described above, using decreasing amounts of the ammonium compound. The smallest amount of reactive material comprised 0.5% to 1% by weight of the sodium silicate compound. A cured film emerged over a period of several days.

I claim:

1. A silica-based water-insoluble film forming binder which is produced by a reaction of an ammonium, amine or amide compound with a silicate.

2. The binder as claimed in claim 1 wherein alcohol is present as a plasticizer.

3. The binder as claimed in claim 1 wherein the ammonium, amine or amide compound is selected from the group consisting of ammonium hydroxide, hexamethylene tetramine and triethanol amine.

4. The binder as claimed in claim 1 wherein the silicate is a liquid silicate.

5. The binder as claimed in claim 4 wherein the liquid silicate is selected from the group consisting of sodium silicate, potassium silicate, methyl silicate, and ethyl silicate.

6. The binder as claimed in claim 4 wherein the liquid silicate is a colloidal silicate.

7. The binder as claimed in claim 1 wherein the ammonium, amine or amide compound is in an aqueous solution prior to reaction thereof with the silicate.

8. The binder as claimed in claim 2 wherein the ammonium, amine or amide compound and alcohol are in an aqueous solution prior to reaction thereof with the silicate.

9. The binder of claim 1 wherein pH adjustment is effected by adding an alkali metal hydroxide to the reactants.

10. The binder as claimed in claim 1 comprising the reaction product of 15%–20% of polyhydric alcohol and 5%–10% of the ammonium, amine or amide compound by weight in an aqueous solution, reacted with 70%–80% of sodium silicate.

11. A method of forming a water insoluble film forming silica-based binder comprising:

providing an ammonium, amine or amide compound in an aqueous solution;

blending the ammonium, amine or amide compound in an aqueous solution with a liquid silicate to form a mixture;

condensing the mixture to form the water insoluble film forming silica-based binder.

12. The method as claimed in claim 11 wherein a plasticizer is present and is an alcohol.

13. The method as claimed in claim 11 wherein an alkali metal hydroxide is used to control pH.

14. A method as claimed in claim 11 wherein the condensation mixture is exposed to sunlight to accelerate curing.

15. The method of claim 11 wherein the ammonium, amine or amide compound is selected from the group consisting of ammonium hydroxide, hexamethylene tetramine and triethanol amine.

16. The method as claimed in claim 11 wherein the silicate is selected from the group consisting of sodium silicate, potassium silicate, methyl silicate, and ethyl silicate.

17. The method as claimed in claim 12 wherein the alcohol is selected from the group consisting of ethyl alcohol, isopropyl alcohol, ethylene glycol, propylene glycol, glycerol, sorbitol and mannitol.

18. The method of claim 12 wherein 15% to 20% of polyhydric alcohol is formed in an aqueous solution with 5% to 10% of the ammonium, amine or amide compound, blended with 70% to 80% of sodium silicate.

19. The method as claimed in claim 11 wherein the silicate is a colloidal silicate.

20. A silica-based water-insoluble film forming binder which is produced as a condensation reaction product of a reaction of an ammonium, amine or amide compound with a silicate.

21. The binder of claim 20 wherein the condensation reaction product further comprises a plasticizer, the plasticizer being an alcohol.

22. A paint composition comprising, as vehicle, a silica-based water-insoluble film forming binder which is obtained as a reaction product of a reaction of an ammonium, amine or amide compound with a silicate.

23. The paint composition of claim 22 further comprising a plasticizer, the plasticizer being an alcohol.

24. The gelation compound obtained as a reaction product of a reaction between a reactive compound and a liquid silicate, the reactive compound selected from the group consisting of an ammonium, amine or amide compound, sodium hexametaphosphate, propylene glycol, ethylene glycol and the primary alcohols, the gelation compound providing a water-insoluble film at normal atmospheric pressure and temperature.

* * * * *